United States Patent [19]

Sutker et al.

[11] Patent Number: 4,728,463

[45] Date of Patent: Mar. 1, 1988

[54] BROMINATED FIRE RETARDANT COMPOSITION

[75] Inventors: Burton J. Sutker, Edison; Gen-Shing Ti, Piscataway; Mo A. Khuddus, Matawan, all of N.J.

[73] Assignee: Ethyl Corporation, Richmond, Va.

[21] Appl. No.: 897,582

[22] Filed: Aug. 18, 1986

[51] Int. Cl.$^4$ .................... C09K 21/00; C08L 25/14; C08L 27/00; C08F 14/00
[52] U.S. Cl. .................... 252/609; 252/601; 260/DIG. 24; 521/906; 521/907; 525/74; 525/78; 525/81; 525/192; 525/194; 525/207; 525/221; 525/225; 526/296
[58] Field of Search ............. 252/601, 609; 524/424, 524/409, 371, 375, 404, 405, 406, 408, 409, 411, 412, 424, 425, 426, 427, 430, 456, 504, 521, 907, 908, 906; 260/DIG. 24; 525/64, 72, 74, 78, 81, 121, 122, 187, 192, 194, 207, 221, 225, 523, 530, 285, 288; 526/271, 272, 296

[56] References Cited

U.S. PATENT DOCUMENTS

| | | | |
|---|---|---|---|
| 3,966,843 | 6/1976 | Finberg | 525/225 |
| 4,032,509 | 6/1977 | Lee | 524/424 |
| 4,048,263 | 9/1977 | Lee | 524/424 |
| 4,051,311 | 9/1977 | Lee | 524/456 |
| 4,108,943 | 8/1978 | Lee | 524/504 |
| 4,544,682 | 10/1985 | Corbett et al. | 525/327.6 |

*Primary Examiner*—Stephen J. Lechert, Jr.
*Assistant Examiner*—Howard J. Locker
*Attorney, Agent, or Firm*—Donald L. Johnson; John F. Sieberth; W. G. Montgomery

[57] ABSTRACT

Brominated styrene-maleate copolymer containing at least 50 weight percent bromine and its use as a fire retardant.

19 Claims, No Drawings

BROMINATED FIRE RETARDANT COMPOSITION

BACKGROUND OF THE INVENTION

Fire retardants are frequently added to organic compositions that would normally burn in air when contacted with an ignition source. Such additives prevent burning or at least reduce the ability to burn or smolder. Such additives often contain bromine. However not all bromine compounds can be successfully used as fire retardants because they lack one or more of the required attributes of a useful fire retardant. Such fire retardants must be compatible with the substrate in which it is placed or it will separate causing what is referred to as "bloom". The additive must not severely lower physical properties of the substrate when used in an organic polymer. Another beneficial property of a successful fire retardant is its ability to resist discoloration upon exposure to ultraviolet radiation.

SUMMARY OF THE INVENTION

It has now been discovered that the tendency to burn of a broad range of organic materials can be sharply reduced by the addition of a brominated styrene-maleate copolymer either alone or in combination with a synergistic amount of an antimony compound. This brominated copolymer is highly compatible with a wide range of organic polymers such as ABS, HIPS and polyphenylene ethers.

DESCRIPTION OF THE PREFERRED EMBODIMENTS

A preferred embodiment of the invention is an organobromine fire retardant comprising a brominated styrene-maleate copolymer which contains at least 50 weight percent bromine. More preferably the fire retardant will contain at least 60 weight percent bromine bonded to the copolymer.

Styrene-maleate copolymers are well-known compositions. The maleate comonomers can be maleic anhydride or acid, a maleate ester, a maleate salt or a maleate imide. Typical esters include the alkyl esters such as methyl, ethyl, propyl, butyl, dodecyl and the like. Methyl maleate is the preferred alkyl maleate.

The maleate ester can be an aryl maleate. Examples of suitable aryl groups are phenyl, tolyl, xylyl, napthyl, p-phenoxyphenyl and the like.

Also aralkyl maleates can be used as comonomers. These include benzyl, α-methylbenzyl, p-phenylbenzyl, p-phenoxybenzyl and the like.

Useful maleate salts include the alkali metal salts especially sodium. Alternatively, maleic anhydride may be used as the comonomer and then reacted with an alkali metal hydroxide to form a salt. In a two-phase neutralization using an organic solvent and aqueous sodium hydroxide, a phase transfer catalyst such as a quaternary ammonium halide or hydroxide is beneficial.

The styrene-maleate copolymer can be a copolymer of styrene and two or more different maleate comonomers such as a mixture of maleic anhydride and methyl maleate.

The maleate imides or maleimides used to make the copolymers can be simple unsubstituted imides derived from ammonia or a substituted imide derived from a primary amine. These include alkyl amines such as methyl amine, ethyl amine, propyl amine, octyl amine, 2-ethylhexyl amine and the like. Alkyl amines form N-alkyl imides of maleic acid.

Aryl amines including brominated aryl amines can also be used to form the imides. Examples of such aryl amines include aniline, o-toluidine, m-toluidine, p-phenylenediamine, m-phenylenediamine, 4-bromoaniline, 2,4-dibromoaniline and the like. These form N-aryl imides of maleic acid.

Imides can also be made from polyalkylene polyamines such as ethylenediamine, diethylenetriamine, triethylenetetraamine and the like.

Styrene-maleic anhydride ("SMA") is a commercially available copolymer. The SMA can be brominated by reaction with bromine or bromine chloride in an inert solvent using a Friedel Crafts halogenation catalyst. The brominated SMA can then be converted to a salt by reaction with a strong base such as NaOH. It can be esterified by reaction with an alcohol. Heating SMA with a primary amine forms an imide.

The following examples show the preparation of several brominated SMA copolymer fire retardants.

EXAMPLE 1

In a glass reaction vessel fitted with a stirrer, reflux condenser, thermometer and addition funnel was placed a solution of 37.65 grams of styrene-maleic anhydride copolymer (Dylark® 232) in 317 grams of ethylene dichloride and 4.6 grams of anhydrous antimony chloride. A solution of 115 grams of Br-Cl in 145 grams of ethylene dichloride was added slowly through the addition funnel over a one hour period while stirring. The addition was carried out at room temperature. After the addition was complete, the mixture was stirred for an additional three hours to complete the bromination. Then, 200 ml of 2-ethylhexyl alcohol was added and stirring continued for an hour at room temperature. The upper organic phase was then decanted and the lower solid phase product was washed twice with 250 mls of water and then with 300 ml of 5% aqueous caustic and finally four times with water to a neutral pH. The aqueous phase was removed and the white sticky product was re-slurried in 500 ml of methanol to form a non-sticky crystalline product which was filtered and dried at 125° C. overnight in a hot air oven to give 90 grams of product analyzing 50 weight percent bromine. Infrared analysis showed the product to be a mixture of 2-ethylhexyl ester and sodium salt of brominated styrene maleate.

EXAMPLE 2

In a similar glass reaction vessel was placed a solution of 230 grams of styrene-maleic anhydride copolymer and 1714 ml of ethylene dichloride and 37.5 grams of antimony chloride. A solution of 712 grams of Br-Cl in 712 mls of ethylene dichloride was added slowly through the addition funnel over a 2.5 hour period while stirring at room temperature. After addition was complete, the mixture was stirred for an additional two hours following which 600 ml of methanol was added. The mixture was then stirred for an hour at room temperature following which the product was washed twice with 100 ml portions of water, three times with 1 liter portions of 5% aqueous caustic and finally five times with 1 liter portions of water to a neutral pH. The resultant white product was filtered and dried at 125° C. overnight in an air oven yielding 560 grams of product analyzing 58 weight percent bromine. Infrared spectrum showed the product to be the dimethyl ester of brominated styrene-maleic anhydride copolymer containing a very small amount of sodium salt.

EXAMPLE 3

In a glass reaction vessel as used in the previous examples was placed a solution of 40.3 grams of styrene-maleic anhydride copolymer in 340 mls of ethylene dichloride and 6.6 grams of antimony trichloride. A solution of 125 grams of Br-Cl in 356 ml of ethylene dichloride was added over a 1 hour period to the stirred solution at room temperature. Following this, the reaction mixture was stirred for 3 hours and then washed with 200 mls of water followed by 200 ml of 5% aqueous caustic. A thick white emulsion formed which was added slowly to 3 liters of isopropanol to precipitate the product. The product was recovered by filtration, washed with water and dried at 125° C. overnight to give 82 grams of white product having a bromine content of 50 weight percent.

EXAMPLE 4

In a glass reaction vessel was placed 200 grams of styrene-maleic anhydride copolymer and 500 ml of xylene. This was heated to 70° C. to form a solution. Then 34 grams of 2-ethylhexyl amine was added slowly at 70° C. over a 10 minute period. Heating was continued at reflux for 5 hours with vigorous agitation. After completing the reaction, the mixture was cooled to 60° C. forming a thick slurry of product in xylene. This slurry was added to 2 liters of isopropanol to form a sticky waxy mass which was separated from IPA by filtration and dried at 50°-60° C. in a vacuum oven yielding 208 grams of styrene maleimide of 2-ethylhexyl amine.

EXAMPLE 5

In a glass reaction vessel was placed 86 grams of styrene-maleic imide of 2-ethylhexyl amine prepared above and 530 ml of ethylene dichloride and 11.3 grams of antimony trichloride. A solution of 222 grams of Br-Cl in 200 ml of ethylene dichloride was added slowly at room temperature over a 1 hour period with vigorous agitation. Following this, the reaction mixture was stirred for an additional 4 hours and then washed twice with 200 ml portions of water followed with 2-200 ml portions of 5% aqueous caustic and finally four times with 200 ml portions of water to a neutral pH. The solution of product was added slowly to 2 liters of isopropanol to precipitate product which was sticky and off-white in color. After filtration and isopropanol wash, the product was dried in a vacuum oven at 50° C. yielding a soft waxy product containing 23 weight percent bromine.

The novel fire retardants can be used in a broad range of organic materials that would normally burn in air. These include paper and paper products, wood and wood products such as plywood. They may also be used to treat combustible insulation such as cellulosic insulation.

The novel fire retardants are useful in organopolymers such as the polyamides (e.g. nylon), polyaramides, polyesters (e.g. poly-1,4-butyleneterphthalate), polyarylene ethers (e.g. poly-2,6-dimethylphenylene ether), rubber-modified polyphenylene ethers, polyolefins (e.g. polyethylene, polypropylene, polybutadiene, ethylene-propylene copolymers, ethylene-propylene-diene terpolymers, etc.), polyvinylaromatics (e.g. polystyrene, polymethylstyrene, etc.), polyurethanes, polyureas, polyimides and the like.

The fire retardants are very useful in polymers and copolymers of ethylenically unsaturated monomers. These include the olefin polymers and copolymers, polyacrylates, polymethacrylates, polyacrylonitrile, styrene-butadiene copolymer, styrene-butadiene-acrylonitrile terpolymer, styrene-maleic anhydride copolymer, polystyrene, rubber-modified polystyrene (i.e. high impact polystyrene) and the like including blends and alloys of two or more organopolymers.

The amount of the brominated copolymer incorporated into the organic composition should be a fire retardant amount. This can vary depending upon the initial flammability of the substrate and the degree of protection desired. In general a concentration in the range of 1-25 weight percent can be used. A more preferred range is about 10-20 weight percent.

The fire retardant effect of the brominated copolymers can be increased by including an antimony compound as a synergist. Finely divided antimony oxide is generally used for this purpose at a concentration of about 1-5 weight percent, more preferably about 2-4 weight percent.

Tests were conducted to determine the effectiveness of the new fire retardants in various compositions. The first test was conducted in an acrylonitrile-butadiene-styrene copolymer (Borg-Warner ABS T-1000). The Oxygen Index ASTM D2863-70 (minimum percent oxygen required to support combustion) and Underwriters Laboratory UL-94 flammability tests were used. The results obtained in ABS are shown in Table 1.

TABLE 1

|  | PARTS BY WEIGHT | | |
|---|---|---|---|
| ABS | 100 | 78.7 | 79.1 |
| Brominated Copolymer A[1] | — | 18.3 | — |
| Brominated Copolymer B[2] | — | — | 17.9 |
| Antimony Oxide | — | 3.0 | 3.0 |
| UL 94 Rating[3] | burn | V-O | V-O |
| Oxygen Index | 18.5 | 26.1 | 26.1 |

[1]Brominated Styrene-Maleate Sodium Salt (64.3 weight percent bromine)
[2]Brominated Styrene-Maleate Methyl Ester (66.47 weight percent bromine)
[3]Ratings are V-O (best), V-1, V-2 and Burn (worst)

These results show that the new brominated copolymers are exceptionally effective in ABS.

The additives were also tested in rubber-modified polystyrene (American Hoechst HIPS 840D). The same tests were used. The results are given in Table 2.

TABLE 2

|  | PARTS BY WEIGHT | | |
|---|---|---|---|
| HIPS | 100 | 80.5 | 80.5 |
| Brominated Copolymer A | — | 15.5 | — |
| Brominated Copolymer B | — | — | 15.1 |
| Antimony Oxide | — | 4.0 | 4.0 |
| UL 94 Rating | burn | V-O | V-O |
| Oxygen Index | 18.5 | 22.6 | 22.9 |

Further tests were conducted to determine the fire retardancy effectiveness of the new additives in rubber-modified polyphenylene ether (General Electric Company, Noryl ® 731.) The same tests were used. The results are shown in Table 3.

TABLE 3

|  | PARTS BY WEIGHT | |
|---|---|---|
| Noryl ® 731[1] | 56.5 | 56.9 |
| HIPS[2] | 28.3 | 28.4 |
| Antimony Oxide | | |

TABLE 3-continued

| | PARTS BY WEIGHT | |
|---|---|---|
| Thermoguard S[3] | 3.7 | 3.7 |
| Br—SMA Methyl Ester | 11.5 | |
| Br—SMA di-2-ethylhexyl Ester | | 11.0 |
| UL 94 Rating 1/16 inch | V-O | V-1 |
| UL 94 Rating ⅛ inch | V-O | V-O |

[1] General Electric brand rubber-modified poly-(2,6-dimethyl-phenylene)ether
[2] High impact polystyrene
[3] M & T brand antimony oxide These tests confirm that the brominated SMA copolymers are very effective fire retardants. The additives were also found to have better UV stability compared to other polymeric fire retardants such as brominated polystyrene.

We claim:

1. An organobromine fire retardant comprising a brominated styrene-maleate copolymer which contains in excess of 60 weight percent bromine.
2. A fire retardant of claim 1 wherein said maleate is a maleate ester.
3. A fire retardant of claim 2 wherein said ester is a methyl ester.
4. A fire retardant of claim 1 wherein said maleate is a maleate salt.
5. A fire retardant of claim 4 wherein said salt is an alkali metal salt.
6. A fire retardant of claim 5 wherein said alkali metal is sodium.
7. A fire retardant of claim 1 wherein said copolymer is a styrene-maleic anhydride copolymer.
8. Organic material normally susceptible to burning in the presence of air and an ignition source containing a fire retardant amount of an organobromine compound of claim 1.
9. A composition of claim 8 wherein said organic material is an organopolymer.
10. A composition of claim 9 wherein said organopolymer is a polymer of one or more monomers having ethylenic unsaturation.
11. A composition of claim 10 wherein said polymer is a polystyrene.
12. A composition of claim 11 wherein said polystyrene is a rubber-modified high impact polystyrene.
13. A composition of claim 10 wherein said polymer is an acrylonitrile-butadiene-styrene copolymer.
14. A composition of claim 10 wherein said organopolymer is a styrene-maleic anhydride copolymer.
15. A composition of claim 9 wherein said organopolymer is a polyester.
16. A composition of claim 9 wherein said organopolymer is a polyurethane.
17. A composition of claim 9 wherein said organopolymer is a polyphenylene ether.
18. A composition of claim 17 wherein said polyphenylene ether is a poly-2,6-dimethylphenylene ether.
19. A composition of claim 18 wherein said poly-2,6-dimethylphenylene ether is modified by the inclusion of a rubber.

* * * * *